Oct. 3, 1961         W. J. UPDEGRAVE         3,003,062
POSITIONING INSTRUMENTS FOR X-RAY FILM
Filed Nov. 19, 1959                          4 Sheets-Sheet 1
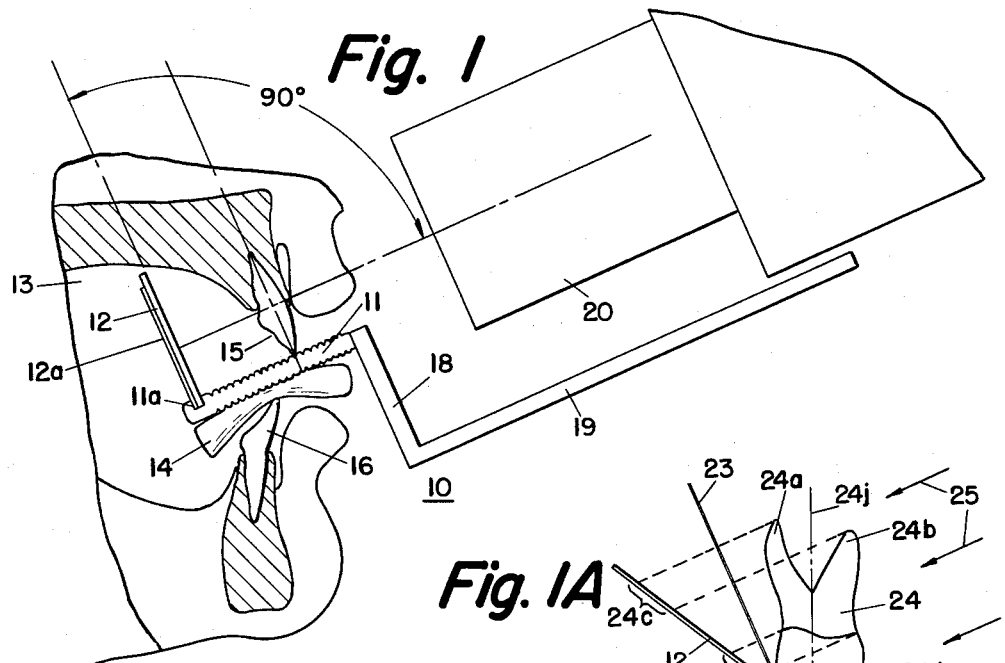
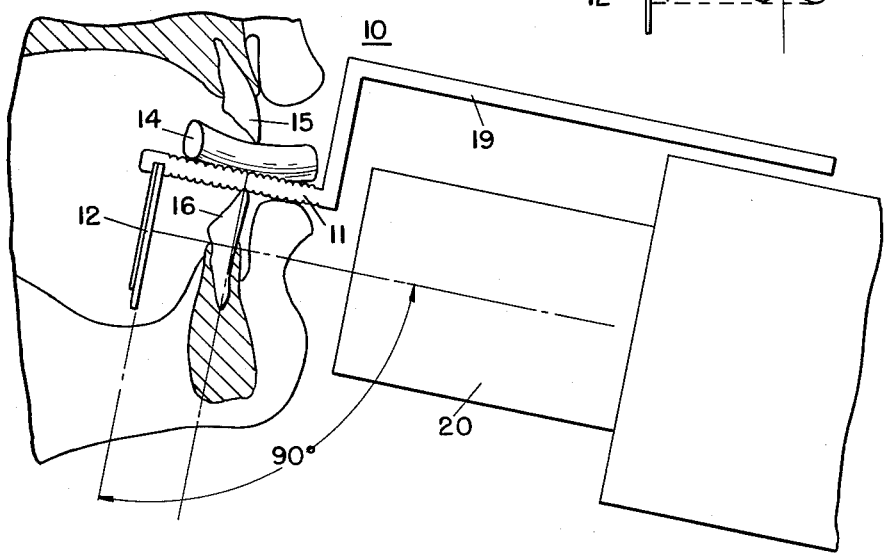

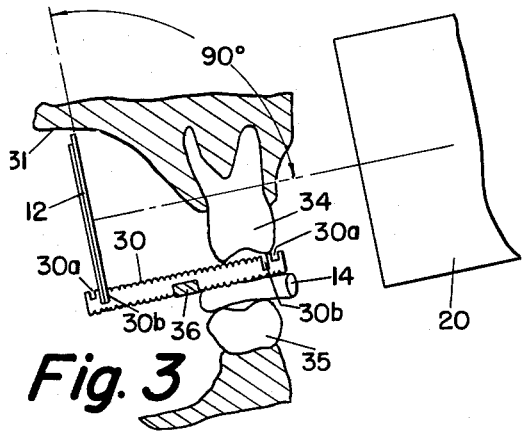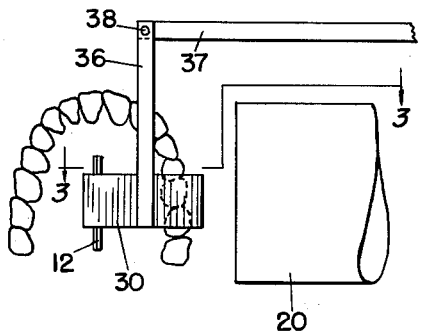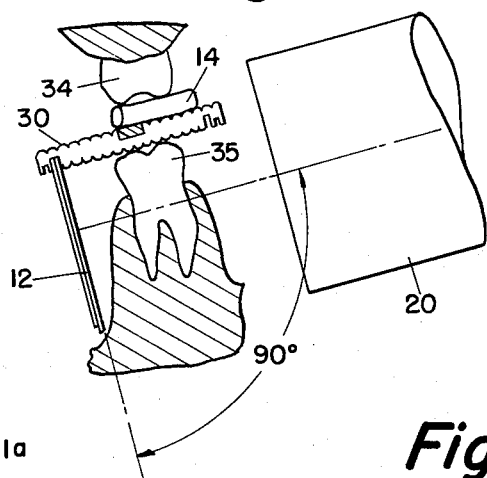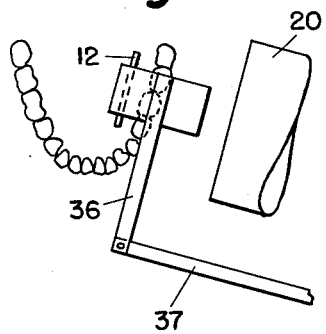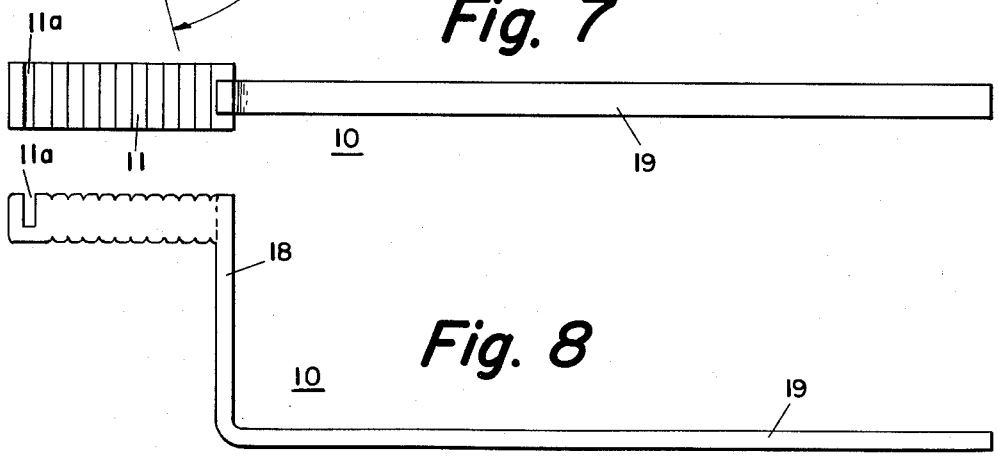

Oct. 3, 1961 W. J. UPDEGRAVE 3,003,062
POSITIONING INSTRUMENTS FOR X-RAY FILM
Filed Nov. 19, 1959 4 Sheets-Sheet 3
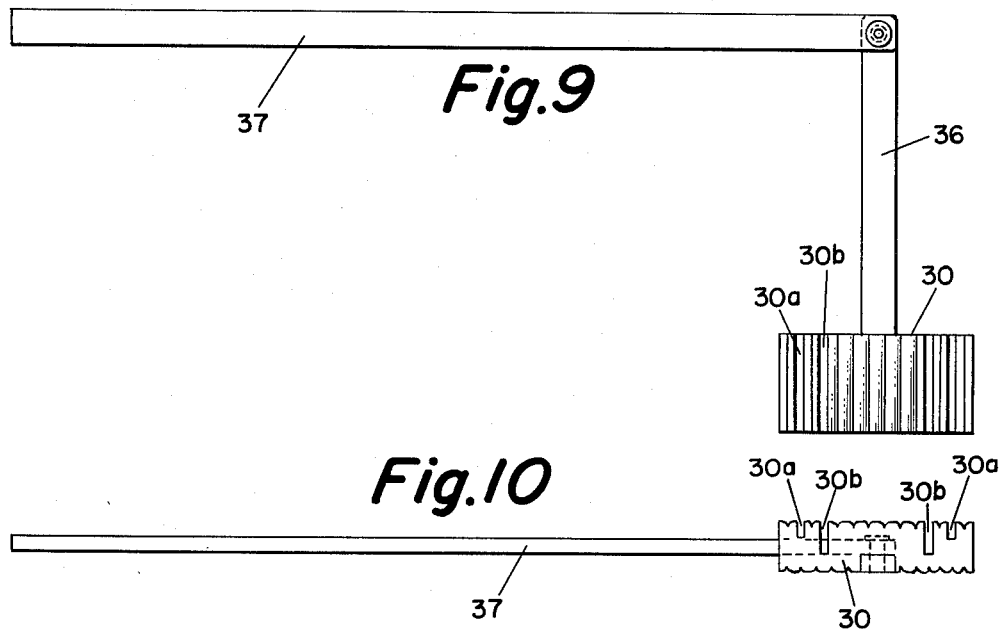
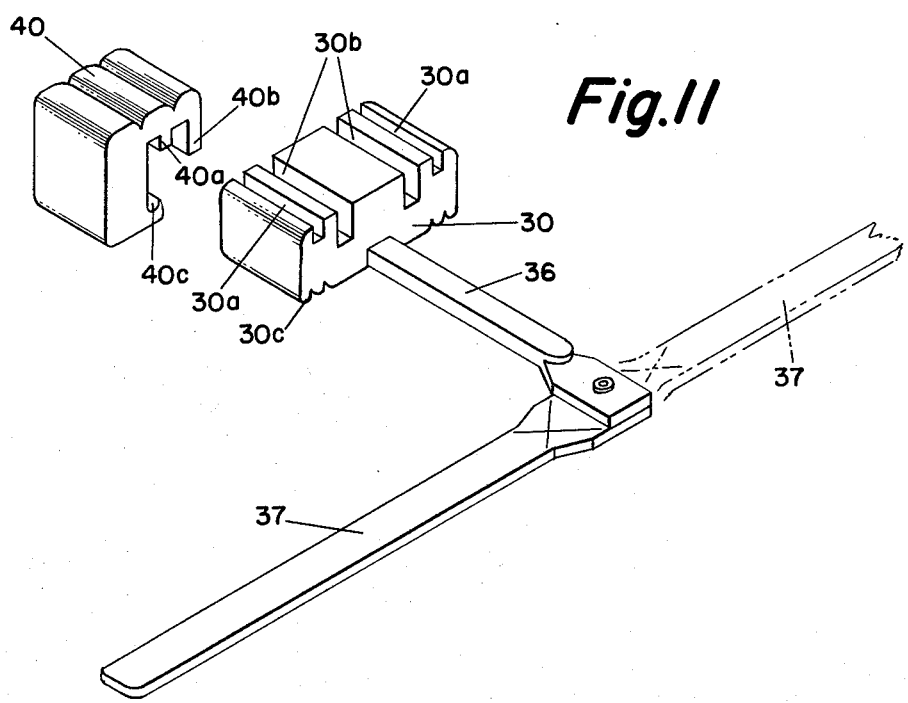

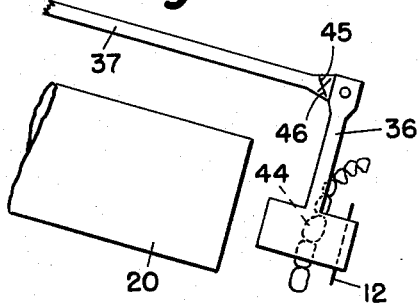
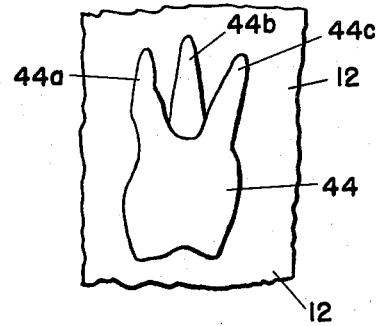
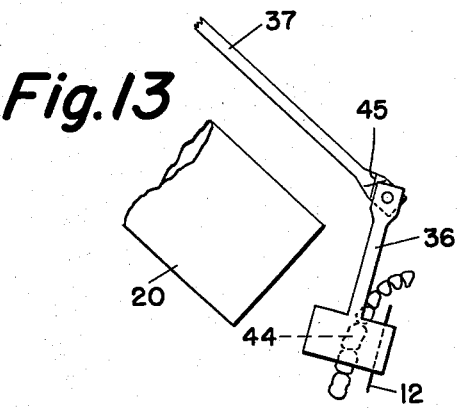
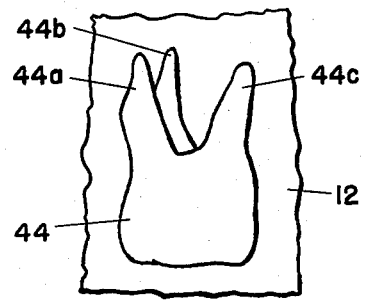
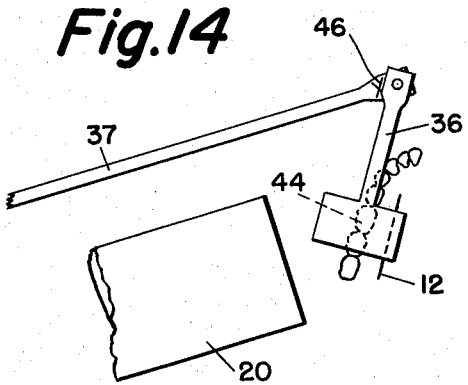
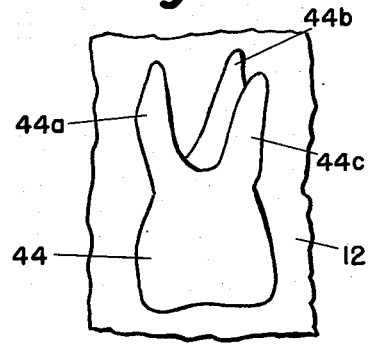

United States Patent Office 3,003,062
Patented Oct. 3, 1961

3,003,062
POSITIONING INSTRUMENTS FOR X-RAY FILM
William James Updegrave, 616 W. Hortter St.,
Philadelphia 19, Pa.
Filed Nov. 19, 1959, Ser. No. 854,120
10 Claims. (Cl. 250—70)

This invention relates to instruments useful in positioning X-ray film within the mouth for the taking of X-ray films of the teeth, and has for an object the provision of an instrument or positioning-angulator by means of which the film may be held in spaced relation with the teeth, and in a direction generally parallel to the long axes of the teeth being X-rayed together with an offset guide by means of which the X-ray-directing extension cone can be positioned for directing the X-rays along a path perpendicular to the X-ray film.

In the past there have been proposed many instruments of various kinds for positioning X-ray film within the mouth. Some of these have positioned the film so as to take advantage of the bisecting-angle technique and a few have positioned the film to take advantage of the paralleling technique, that is to say, to position the film generally parallel to the tooth structure with the extension cone of the X-ray machine positioned to direct the X-rays perpendicular to the X-ray film. One of the latter proposals includes a film holder in which the film is clipped together with a rubber bar sleeve to be gripped within the teeth and an arm which has a straight portion directed to the center of the film and an arcuate portion to make room for the cheek in the positioning of the film between molars. While such an arrangement has certain advantages, it is difficult to align an extension cone of an X-ray machine with the bar pointing centrally thereof. Also, there is difficulty in using this arrangement for the taking of X-ray pictures on both sides of the mouth, because it is necessary to disassemble the proposed arrangement and to re-assemble it with the parts reversed. In addition, the proposed arrangement does not provide any way to compensate for the anatomical limitations and differences between the anterior (front) and the posterior (rear) teeth.

In accordance with the present invention, there are provided instruments which are particularly well adapted to position the film within the mouth cavity in parallel relation to the long axes of the teeth. These instruments have a member and an offset portion which as a whole extend in a direction perpendicular to the plane of the film, but spaced to one side of it. In this manner, the X-ray directing extension cone may be positioned along its length and in alignment with the full length of the offset portion or guide rod and thus there is maximum assurance that the X-rays will be directed in a direction perpendicular to the film. The instruments of the present invention provide rapid and speedy positioning of the film and the extension cone, thus expediting the taking of X-rays and minimizing discomfort to the patient. In one form of the invention the instrument comprises a bite portion and an inwardly extending portion in the form of a bite block and a portion perpendicular to the axis of the bite block forming therewith a T-shaped angulator.

For further objects and advantages of the invention, reference is to be had to the following detailed description taken in conjunction with the drawings, in which:

FIG. 1 illustrates the instrument applied to the taking of the upper anterior teeth;

FIGS. 1A and 1B are drawings illustrative of the difference between the bisecting technique and the paralleling technique;

FIG. 2 illustrates the instrument of FIG. 1 positioned for the taking of X-ray films of the lower anterior teeth;

FIG. 3 illustrates an instrument of the present invention positioned to take X-ray films of the upper posterior teeth;

FIG. 4 is a view looking upwardly into the upper portion of the mouth with the instrument positioned as in FIG. 3, the line on which FIG. 3 was taken appearing in FIG. 4;

FIG. 5 illustrates a fractional part of the instrument in position for taking an X-ray picture of the lower posterior teeth as illustrated in FIG. 6;

FIGS. 7 and 8 are plan and elevations respectively of the instrument of FIGS. 1 and 2;

FIGS. 9 and 10 are plan and elevations respectively of the instrument of FIGS. 3–6;

FIG. 11 is an isometric drawing of a modified form of the invention; and

FIGS. 12, 12A, 13, 13A, 14 and 14A illustrate an instrument of the present invention positioned to take X-ray films of the upper posterior teeth and in particular to obtain unobstructed views of the individual roots of multi-rooted teeth.

Referring now to FIG. 1, the instrument 10 of the present invention which I prefer to call an angulator or a positioning-angulator consists of a first portion or bite block 11 having roughened or grooved upper and lower surfaces forming a bite portion. A film-supporting slot 11a is located at one end portion of the bite block 11. Within the slot 11a there is frictionally held a pre-packaged X-ray film or film packet 12. These film packets include a piece of film inside of a paper cover. A metal or plastic plate 12a is placed behind the film packet 12 and in the slot 11a to provide substantial rigidity to the film packet 12 and particularly in maintaining the film packet in a flat plane. Thus, with one edge wedged within the slot 11a, the film packet 12 extends in a direction perpendicular to the longitudinal axis of the first portion 11. It is to be noted that this first portion 11 is fairly long and adequately so to position the packaged film 12 for extension upwardly into the highest point of the vault or cavity 13 of the mouth.

A cotton roll is placed between the lower teeth 16 and the lower surface of the first portion 11. Thus, the first portion 11 of the instrument is clamped between the upper teeth 15 and the lower teeth 16. It will be observed that the lower teeth 16 provide a force to the portion 11 that is between the force produced by the upper teeth 15 and by the film 12. Thus, the lower teeth 16 act to rigidly position the film 12 in the vault 13 of the mouth.

A second portion 18 of the instrument extends from the end remote from the slot 11a and in a direction away from the first portion 11 and preferably at an angle 90° from the longitudinal axis of the first portion 11. The second portion 18 at its end merges with a third portion 19 of considerable length which forms a guide for the extension cone 20 of an X-ray machine. By thus bringing the extension cone 20 into a position where the longitudinal axis of the cone 20 is in alignment with or parallel to the third or guide portion 19, it will be seen that the longitudinal axis of that cone will intersect the center of the film packet 12. Thus, X-rays delivered from the extension cone 20 will be directed through paths substantially perpendicular to the plane of the film packet 12.

The instrument as described in connection with FIG. 1 is particularly well suited to take advantage of what has been termed paralleling technique in the taking of X-ray films. The more popular method of taking X-ray films has been illustrated in FIG. 1A and is known as the bisecting angle technique. Thus, a film packet 12 is disposed within the mouth and generally the patient is asked to press the film against the tooth and gum with the finger or it is held by some positioning device until the X-ray is taken. The operator then endeavors to bring the X-ray machine into a position so that the X-rays 25 will be normal to a line 23 bisecting the angle formed by the plane of the film 12 and a dividing line through the long axis 24*j* of the tooth 24, the X-ray of which is to be taken. By reason of the angular position of the film 12, it will be seen that one root 24*a* is on film 12 indicated to be of a height greater than that of a second root 24*b* by the amount shown by the bracket 24*c*. The same observation can be made in respect to the enamel portion 24*d* of the tooth, which it will be seen is shown on the film to have a width 24*e*.

The distortions apparent in FIG. 1A do not occur with the paralleling technique where it will be observed, FIG. 1B, that the film packet 12 is parallel to the long axis 24*j* of the tooth 24. Thus, the root 24*a* is shown on the film to have a height which is only slightly greater than the root 24*b*, this height being indicated by the bracket 24*f*. Similarly, the enamel portion of the tooth as appearing between the broken lines has a height of width accurately portrayed between the dimension lines 24*g*.

The foregoing has been presented to demonstrate the superiority of the paralleling technique as compared with the bisecting angle technique since the paralleling technique is in accordance with the present invention utilized for X-rays of all of the teeth appearing in the mouth.

The instrument 10 is particularly well adapted for the taking of X-ray films of the anterior or the front teeth. Thus, for the upper teeth, the instrument 10 of FIG. 1 is simply moved laterally from one position to another until the desired number of X-ray films have been taken. For the lower anterior teeth, the instrument 10 is turned upside-down from the position illustrated in FIG. 1. It will be noted that the cotton roll 14 is now positioned against the upper teeth 15 and that the film packet 12 is located along the line generally parallel with the long aixs of the tooth 16. It will be observed there has been a large change in the angular position of the extension cone 20. The extension cone 20 is again located in alignment and parallel to the guide portion 19. With the instrument positioned as illustrated, the X-rays are again directed perpendicular to the film packet 12, that normality being shown by the dimensional arrows and the label "90°."

For taking X-ray films of the posterior or more remotely located teeth, an instrument, embodying the principles of the invention thus far explained is utilized. As shown in FIG. 3, this instrument includes a first portion or bite block 30 having film-supporting slots 30*a* and 30*b* located at its respective end portions. A film packet 12 is frictionally held within the deeper left-hand slot 30*b*. The film packet 12 is held within the slot extending in a direction generally perpendicular to the plane of the bite block 30. The deeper slot 30*b* is utilized because of the relatively shallow spacing of the roof 31 of the mouth. Were this roof cavity or vault of greater extent, then the film 12 would be positioned in the shallower slot 30*a*. In different persons, the described distance varies considerably and the instrument takes into account such variations for the best location of the film 12. As in the modification of FIG. 1, when taking X-ray pictures of the upper posterior teeth, the surface of the portion 30 opposite to that carrying the film bears against a cotton roll 14 so that the roughened or grooved surfaces of the portion 30 are utilized as a bite portion and are held by the patient between his upper molars or teeth 34 and the lower teeth 35. Thus, the plane of the bite portion 30 rests flat against the chewing surfaces of the molars or teeth 34. The planes of the chewing surfaces of the molars are known to be generally perpendicular to the long axes of the molars. Since the film packet 12 is perpendicular to the plane of the bite portion 30, the film packet automatically assumes a position parallel to the long axes of the molars or teeth 34.

A second portion 36 is integrally molded to the center of the first portion 30 and extends in a direction perpendicular to the longitudinal axis of the first portion 30. It will be observed that the second portion 36 forms the leg and the first portion 30 forms the arms of the letter T. This T-shaped structure is particularly advantageous by reason of the multiple functions performed by it. At the end of the portion 36, remote from the portion 30, there is provided a third or guide portion 37 pivoted to the second portion 36, as at 38. The portion 37 is turned to a position at right angles to the portion 36. Thus, the guide portion 37 extends in a direction perpendicular to the plane of the film 12 and parallel to the longitudinal axis of the first portion 30. The longitudinal axis of the extension cone 20 is then located in alignment with and parallel to the guide portion 37. When the exposure is made, the X-rays are directed through the cone 20 to intersect the film packet 12 in a perpendicular sense to provide technically perfect X-ray films.

For taking an X-ray film of the lower posterior teeth as illustrated in FIG. 6, the instrument is positioned as shown in FIGS. 5 and 6. Again it will be noted the cotton roll 14 has now been placed against the upper surface of the first portion or bite block 30 with the lower roughened surface against the molar 35, the X-ray of which is now to be taken. As before, the film 12 is held in a position by a normal biting action so that it is positioned parallel to the long axis of the tooth 35. Again the position of the extension cone 20 of the X-ray machine in FIG. 6 is to be contrasted with the position of the cone 20 in FIG. 4. It will be observed that there has been a change in the angular position of the cone 20. This change is necessary so that the cone 20 is again located in alignment with and parallel to the guide portion 37. With the cone 20 positioned as illustrated in FIG. 6, the X-rays are directed through the cone 20 perpendicular to the film packet 12.

In FIGS. 7 and 8, the angulator or film-positioning instrument of FIGS. 1 and 2 has been illustrated to a somewhat greater scale than in FIGS. 1 and 2, the better to illustrate the relative dimensions of the parts. In this connection, the first portion or bite block 11 in the actual size of the instrument is about 1¾", with the offset or second portion 18 about 1⅞". The third or guide portion may be of any desired length, such as for example, as 6¼". It will be noted that the grooves on the bite portion 11 of the angulator 10 are corrugated with the corrugations forming the alternate peaks and valleys being disposed laterally of the bite portion 11; more particularly, parallel with the film-supporting slot 11*a*. By providing these laterally extending grooves, the teeth which engage with them on the film-side of the angulator perform a positioning function which is enhanced by the roll of cotton 14, FIG. 2. Thus, this roll of cotton tends to distribute the forces developed by the teeth acting against the end with respect to the teeth on the film side of the bite block 11, thus to provide a stable support not only for the film 12 but also for the third portion 19 which forms the positioning guide for the extension cone 20*a*.

In FIGS. 9 and 10, the angulator or instrument of FIGS. 3–6 inclusive has been illustrated in somewhat larger scale, the better to show the relative positions of the parts on either side of the second portion 36. Thus, the first portion or bite block 30 extends on opposite sides of the portion 36 by about ¾". Since, as pointed out above, mouth cavities vary, there will be utilized one or the other of the spaced package-supporting slots 30*a* and 30*b* depending upon the requirements. While it is easy enough to position the guide portion 37 at right angles to the portion 36, if desired suitable indicia may be provided on these two arms to indicate when the guide portion 37 is in a position perpendicular to the portion 36. It will be observed that the corrugations described above in connection with the modifications of FIGS. 7 and 8 are also utilized in the modification of FIGS. 9–11 and that these corrugations on the bite portion of the bite block 30 extend laterally of the longitudinal axis of the bite block 30 and parallel to the film-supporting slots 30a and 30b. In the modification of FIG. 11, the corrugated roughened surface performs the same functions as described for the earlier modification.

In the modification of FIGS. 9 and 10, the bite block 30 includes the region of the slots 30a and 30b. If desired, these slots may be disposed nearer to the second portion 36 providing the bite block be of greater length. Such an arrangement is shown in FIG. 11 where, it will be noted the film-supporting slots 30a and 30b are located nearer to the portion 36 than in the previous embodiment of FIGS. 9 and 10. However, by utilizing a slide 40 having dependent portions 40a and 40b complementary to the slots 30a and 30b and having a groove 40c adapted to embrace the curved portion 30c, the bite portion will then be formed by the grooved top surface of the slide 40. This slide then not only covers the film-supporting slots 30a and 30b, but provides for the lengthening of either the left or the righthand side of the bite block 30. This lengthening of the bite block 30 assures the positioning of the film away from the teeth and downwardly or upwardly into the mouth cavity so that the film may be set up in alignment with, parallel to, the general direction of the long axes of the teeth in order to take maximum advantage of the paralleling technique.

As in the modification of FIGS. 9 and 10, the guide portion 37 can be swung from its full line position to its broken line position, it being understood, of course, that the extension slide 40 will at the same time be removed from the left-hand side and placed on the right-hand side of the instrument. Both of the positions of the guide portion 37 are perpendicular to the portion 36.

The guide portion 37 can be swung at angles other than 90° to the portion 36. Typical examples of these other angles as compared to the 90° angle are illustrated in FIGS. 12, 13 and 14. The usefulness of such technique is, for example, in the examination of an individual root of a multi-rooted tooth where such root is normally partially obscured when using the technique described above. FIG. 12 shows the normal paralleling technique used in taking X-ray films of the upper posterior teeth similar to that described previously and shown in FIGS. 3 and 4. The film 12 in FIG. 12A produced by this technique shows the tooth 44 with all the roots 44a, 44b and 44c reasonably discernible. In some instances, it is desirable to clearly film the root 44a distinct from the roots 44b and 44c and in other instances, it is desirable to clearly film the root 44c distinct from the roots 44a and 44b.

In order to film the root 44c distinctly, the guide portion 37 is swung with respect to the portion 36 until it is in line with the marking line 45, as illustrated in FIG. 13. The marking line 45 is drawn so that the angle between the guide portion 37 and the portion 36 is 135°. The guide portion 37 could be swung to any desired angle and the purpose of the marking line 45 is to standardize and control the angular change. The extension cone is again located in alignment with and parallel to the guide portion 37 and the resulting X-ray film 12 in FIG. 13A shows the root 44c unobscured by the roots 44a and 44b.

The guide portion 37 could also be swung with respect to the portion 36 to a position as illustrated in FIG. 14. The guide portion 37 is now in line with the marking line 46 and at a 45° angle with the portion 36. The extension cone 20 is aligned with and directed parallel to the guide portion 37. The resulting X-ray film 12 in FIG. 14A shows the root 44a unobstructed by the roots 44b and 44c. Thus, the films of FIGS. 12A, 13A and 14A provide observations of the tooth 44 from three selected positions to more fully aid in the examination of the tooth 44.

It is to be noted that in FIGS. 12, 13 and 14 the film packet 12 is always maintained generally parallel to the long axes of the teeth 44 and 45, as required by the paralleling technique. In addition, in FIGS. 12, 13 and 14 the extension cone 20 or the longitudinal axis of the extension cone 20 is maintained parallel to the guide portion 37, as further required by the paralleling technique. Thus, if it be assumed for an example that the film 12 is in the vertical plane, then the longitudinal axis of the extension cone 20 would be in the horizontal plane perpendicular to the vertical plane of the film 12. In FIG. 12, the longitudinal axis of the cone 20 itself is perpendicular to the film 12 while in FIGS. 13 and 14, the longitudinal axis of the cone 20 is at angles other than 90° with the film 12. Therefore, a factor of distortion is introduced in the films of FIGS. 13A and 14A in order to get unobstructed views of the roots 44a and 44c. However, all of the benefits of the paralleling technique as described previously are retained except that the left side of the film 12 is distorted with respect to the right side. This distortion will be present whatever technique is used when it is necessary that the longitudinal axis of the X-rays be directed at angles other than 90° to the film.

What is claimed is:

1. A positioning-angulator for producing dental X-ray films utilizing the paralleling technique, comprising a bite block having at least one slot disposed adjacent an end portion thereof and extending penpendicular to the long central axis of said bite block, said bite block having a surface on the same side thereof as said slot, which surface extends along a plane perpendicular to the plane of said slot, said surface having a plurality of grooves extending parallel to said slot to provide a corrugated-like surface engageable by the teeth to be X-rayed, the surface of said bite block opposite said corrugated-like surface being engageable by compressible material for transmittal of pressure from the opposing teeth for positioning the bite block with said slot in the region of maximum height of the mouth cavity thereby to position X-ray film disposed within said slot in a direction generally parallel to the long axes of the teeth, and a supporting arm secured to said bite block and having at the end opposite the point of securement to said bite block an offset portion laterally spaced from said slot and extending in a direction perpendicular to the plane of said slot and forming a guide for directing a source of X-rays perpendicular to said plane of said slot and X-ray film supported therein and in a direction perpendicular to said long axes of said teeth being X-rayed.

2. A positioning-angulator for producing dental X-ray films utilizing the paralleling technique, comprising a member of plastic having a first portion of substantial length with roughened upper and lower surfaces, one of which surfaces is adapted to be positioned against selected teeth to be X-rayed, said first portion having a slot extending laterally thereof adjacent one end and of width to receive one edge-portion of a pre-packaged X-ray film packet, said film packet being frictionally held within said slot in a position perpendicular to the longitudinal axis of said first portion, at least said one of said surfaces extending along a plane perpendicular to the plane of said slot, said member having a second portion extending from the end remote from said slot in a direction away from said slot and perpendicular to said longitudinal axis, and said member having a third portion extending in a direction away from said slot and parallel to said longitudinal axis to provide a guide for positioning a source of X-rays for projection of X-rays along said guide and normal to the film packet.

3. A positioning-angulator for producing dental X-ray films utilizing the paralleling technique, comprising a member of plastic having a first portion of substantial length with roughened upper and lower surfaces, one of which surfaces is adapted to be positioned against selected teeth to be X-rayed, said member having slots at its opposite end portions depending from said one surface and extending laterally thereof and of width to receive an edge-portion of a pre-packaged X-ray film packet, said film packet being frictionally held within one of said slots in a position perpendicular to the longitudinal axis of said first portion, at least said one of said surfaces extending along a plane perpendicular to the plane of said slot, said member having a second portion extending in a direction perpendicular to said longitudinal axis and parallel to said laterally extending slots, and said member having a third portion pivoted at one end to said second portion at the end remote from said first portion and rotatable to positions at selected angles to said longitudinal axis.

4. A positioning-angular utilizing the paralleling technique for producing dental X-ray pictures of the posterior teeth, comprising a plastic bite block having grooved bite surfaces at opposite end portions thereo, said bite surfaces being positioned against selected chewing surfaces of the posterior teeth perpendicular to the long axes of said teeth, at least one lateral slot depending from at least one of said surfaces at opposite end portions of said bite block frictionally to seat an edge portion of an X-ray film packet in a position perpendicular to the longitudinal axis of said bite surfaces and parallel to the long-axes of the teeth, at least said one of said surfaces extending along a plane perpendicular to the plane of said slot, and a first and second rod, one end of said first rod rigidly affixed to one of the sides of said bite block midway between said end portions, said first rod extending in a direction perpendicular to said longitudinal axes of said bite surfaces, one end of said second rod hinged to the other end of said first rod and rotatable in a plane parallel to said bite surfaces and offset from said longitudinal axes to provide a guide means adjustable to a predetermined angle to said longitudinal axes of said bite surfaces.

5. An angulator utilizing the paralleling technique for producing dental X-ray pictures of the anterior teeth, comprising a plastic bite block, having a bite portion at one end portion thereof which is held between the teeth and positioned perpendicular to the long axes of the anterior teeth, lateral grooves on the upper and lower surfaces of said bite block, a lateral slot depending from an upper surface at the other end portion of said bite block to frictionally seat an edge portion of a pre-packaged X-ray film in a position perpendicular to the longitudinal axis of said bite portion, at least said one of said surfaces extending along a plane perpendicular to the plane of said slot, said bite block being of sufficient length to allow said film to extend inwardly into the mouth and upwardly into the highest point of the cavity or vault of the mouth, and a first and second rod, one end of said first rod rigidly affixed to said bite portion of said bite block extending in a direction away from said slot and perpendicular to the longitudinal axis of said bite portion, one end of said second rod rigidly affixed to the other end of said first rod extending in a direction away from said slot and parallel to but offset from said longitudinal axis of said bite portion.

6. A positioning-angulator for positioning and supporting an X-ray film packet utilizing the paralleling technique comprising a plastic bite block, lateral grooves cut on the lower surface of said bite block, said bite block having at least one slot depending from its upper surface at its opposite end portions and extending laterally thereof and of width to frictionally seat an edge portion of said film packet, a slide having dependent portions complementary to said grooves and slots of either of said end portions and adapted to embrace either of said end portions, lateral grooves cut on the upper surface of said slide, said upper surface of said slide extending along a plane perpendicular to said slots to form a flat biting surface, the plane of said flat biting surface when positioned against the biting edges of selected teeth is perpendicular to the long axes of said teeth and perpendicular to said film, said slide being of sufficient cross section to increase the length of said bite block to allow said film to extend inwardly into the mouth and upwardly into the highest point of the cavity or vault of the mouth, and a first and a second member, one end of said first member being rigidly affixed to one of the sides of said bite block substantially midway between said end portions, said first member extending in a direction parallel to said laterally extending slots, one end of said second member rotatably connected to the other end of said first member, said second member being rotatable in a plane parallel to said plane of said flat biting surface but offset from the longitudinal axis of said slide for directing a source of X-rays along a path parallel to the last-mentioned plane and for directing the longitudinal axis of said X-rays to a predetermined angle to said film.

7. A positioning-angulator for producing dental X-ray films utilizing the paralleling technique, comprising a bite block having at least one film-receiving slot disposed adjacent opposite end portions thereof and extending perpendicular to the long central axis of said bite block, said bite block having at least one surface extending along a plane perpendicular to the plane of said slot, said surface having a plurality of grooves providing a corruagted-like surface engageable by the teeth to be X-rayed, the surface of said bite block opposite said corrugated-like surface being engageable by compressible material for transmittal of pressure from the opposing teeth for positioning the bite block with said slot in the region of maximum mouth cavity space thereby to position X-ray film disposed within said slot in a direction generally parallel to the long axes of the teeth, and a first and a second member, one end of said first member secured to said bite block substantially midway between said end portions, said first member extending in a direction parallel to said slot, one end of said second member rotatably connected to the other end of said first member, said second member being rotatable in a plane parallel to said corrugated-like surface and offset from the longitudinal axis of said corrugated-like surface, said second member providing a guide for directing the longitudinal axis of a source of X-rays along a path parallel to the corrugated-like surface and at a selected angle to the longitudinal axis of said corrugated-like surface.

8. A dental film holder for positioning a pre-packaged X-ray film in accordance with the paralleling technique, comprising a T-shaped film holder having two arms of equal length, lateral grooves disposed along one of the surfaces of said aligned arms, each of said aligned arms having at least one film-receiving slot on the opposite one of said surfaces frictionally to hold said film within said slot, a slide-extension for one of said aligned arms adapted to embrace said slots and grooves of said aligned arm, lateral grooves cut on said slide-extension to form a biting surface, said biting surface forming a flat plane which when positioned against the chewing surfaces of selected teeth to be X-rayed is perpendicular to the long axes of said teeth and perpendicular to said film, said slide-extension being of a length to position said slot in the mouth region of maximum vault height, a first portion, one end of said first portion being rigidly affixed to the common point of said aligned arms and extending in a direction perpendicular to the longitudinal axis of said slide-extension to form the leg of said T, and said first portion having a second portion pivoted at one end to the other end of said first portion, said second portion being rotatable in a plane parallel to said flat plane to a plurality of positions including two positions parallel to said longitudinal axis of said slide-extension, said second portion being swung to one or the other of said two positions depending upon whether said slide-extension is opposite one or the other of said aligned arms to provide a guide for directing a source of X-rays perpendicular to the long axes of said teeth and perpendicular to said film.

9. An angulator for producing dental X-ray pictures utilizing the paralleling technique comprising a bite block having a bite portion and an inwardly extending portion, the upper surface of said bite portion forming a flat plane which when positioned against the chewing surfaces of selected teeth to be X-rayed is perpendicular to the long axes of said teeth, said inwardly extending portion having at least one slot extending laterally of said inwardly extending portion of width to receive an edge portion of a pre-packaged X-ray film, said film being frictionally held within said slot in a position perpendicular to said flat plane, and a first and a second portion, one end of said first portion being connected to said bite block and extending in a direction perpendicular to said longitudinal axis of said bite portion, one end of said second portion being connected to the other end of said first portion and extending in a direction offset from but parallel to said longitudinal axis of said bite portion to provide a guide for directing a source of X-rays perpendicular to said long axes of said teeth and perpendicular to said film.

10. An angulator utilizing the paralleling technique for producing dental X-ray films of the anterior teeth, comprising a bite block having a flat surface forming a bite portion at one end portion thereof, at least one lateral slot depending from said surface on the other end portion of said bite block frictionally to seat an edge portion of a pre-packaged X-ray film in a position perpendicular to the longitudinal axis of said bite portion, said flat surface extending along a plane perpendicular to said slot, grooves extending across said bite portion to provide a biting surface for selected anterior teeth of one jaw, biting means for the anterior teeth of the opposing jaw, said biting means being held against the surface of said bite block opposite that of said slot by the force exerted by said last-named teeth when positioned so that said force is on a straight line with or inwardly from the force from said selected teeth to position said film parallel to the long axes of said selected anterior teeth, and a first and a second member, one end of said first member rigidly affixed to said bite portion extending in a direction perpendicular to said longitudinal axis of said bite portion, one end of said second member rigidly affixed to the other end of said first member extending in a direction parallel to but offset from said longitudinal axis to provide a guide for directing a source of X-rays perpendicular to said long axes of said selected teeth and perpendicular to said film.

References Cited in the file of this patent
UNITED STATES PATENTS

| | | |
|---|---|---|
| 1,445,169 | Ralph | Feb. 13, 1923 |
| 2,245,395 | Goldberg | June 10, 1941 |
| 2,753,461 | Goldberg | July 3, 1956 |

UNITED STATES PATENT OFFICE
CERTIFICATE OF CORRECTION

Patent No. 3,003,062            October 3, 1961

William James Updegrave

It is hereby certified that error appears in the above numbered patent requiring correction and that the said Letters Patent should read as corrected below.

Column 6, line 26, for "penpendicular" read -- perpendicular --; column 7, line 12, for "-angular" read -- -angulator --; line 15, for "thereo" read -- thereof --; column 8, line 21, for "corruagted-" read -- corrugated- --.

Signed and sealed this 3rd day of April 1962.

(SEAL)
Attest:

ERNEST W. SWIDER            DAVID L. LADD
Attesting Officer            Commissioner of Patents